United States Patent [19]
Oeth et al.

[11] Patent Number: 4,674,798
[45] Date of Patent: Jun. 23, 1987

[54] VEHICLE SEAT ARMREST ADJUSTMENT MECHANISM

[75] Inventors: James F. Oeth, Dubuque; Joseph E. Link, Farley, both of Iowa

[73] Assignee: Deere & Company, Moline, Ill.

[21] Appl. No.: 833,672

[22] Filed: Feb. 24, 1986

Related U.S. Application Data

[63] Continuation of Ser. No. 649,878, Sep. 13, 1984, abandoned.

[51] Int. Cl.⁴ .................................................. A47C 7/54
[52] U.S. Cl. ..................................... 297/411; 297/115
[58] Field of Search ............... 297/411, 416, 417, 412, 297/410, 422, 437, 115, 161, 345, 353; 108/148; 248/412, 157, 231.3, 295.1, 297.2, 298, 118, 415

[56] References Cited

U.S. PATENT DOCUMENTS

| 7,687 | 5/1877 | Morrison | 297/411 X |
| 502,011 | 7/1893 | Frauenstein | 248/231.3 |
| 3,124,330 | 3/1964 | Robinson | 248/231.3 |
| 3,508,733 | 4/1970 | Skeel | 248/415 |
| 3,614,085 | 10/1971 | Cunningham | 297/161 X |
| 4,097,088 | 6/1978 | Meiller | 297/115 X |
| 4,176,878 | 12/1979 | Koutsky | 297/417 X |
| 4,307,913 | 12/1981 | Spiegelhoff | 297/417 |

Primary Examiner—Kenneth J. Dorner
Assistant Examiner—José V. Chen

[57] ABSTRACT

Armrests of a vehicle seat include vertical brackets having legs located in vertical guide slots defined by support structure. A cam plate is rotatably mounted between the brackets for movement between a lock position, wherein it establishes a tight frictional engagement between opposed surfaces of the legs and guide slots, and a release position wherein it permits the legs to move freely in the slots.

7 Claims, 4 Drawing Figures

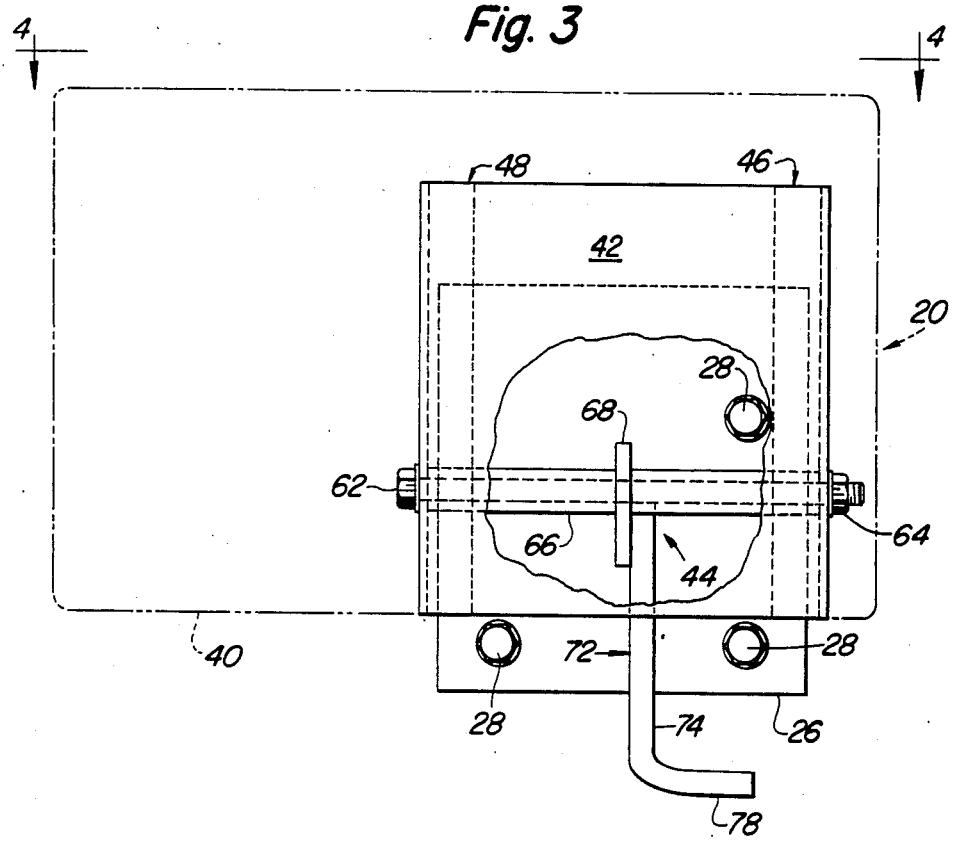

VEHICLE SEAT ARMREST ADJUSTMENT MECHANISM

This application is a continuation of application Ser. No. 649,878, filed Sept. 13, 1984 abandoned 4/28/86.

BACKGROUND OF THE INVENTION

The present invention relates to vehicle seats and more particularly relates to adjustment mechanisms for the armrests of such seats.

It is important that operators of industrial and utility equipment be able to quickly adjust the armrests of the seats thereof so as to accommodate operators of various sizes. Heretofore, mechanisms permitting adjustments of the armrests have been relatively complex.

Now there is provided an armrest adjustment mechanism of simple construction.

SUMMARY OF THE INVENTION

According to the present invention, there is provided a novel vehicle seat armrest adjustment mechanism.

An object of the invention is to provide a mechanism of simple construction for permitting a vehicle armrest to be easily adjusted.

A further object of the invention is to provide a mechanism for permitting a vehicle armrest to be placed in an infinite number of positions in its range of movement.

Yet a more specific object of the invention is to provide an armrest adjustment mechanism including a lever-operated cam movable between locked and unlocked positions for respectively holding an armrest in or releasing it from a selected or previously selected position.

These and other objects, features and advantages of the present invention will become apparent to those skilled in the art from the description which follows and from the drawings.

BRIEF DESCRIPTION OF THE DRAWINGS

FIG. 3 is a side view taken along line 3—3 of FIG. 2.

FIG. 4 is a top view taken along line 4—4 of FIG. 3.

DESCRIPTION OF THE PREFERRED EMBODIMENT

Figure 1:
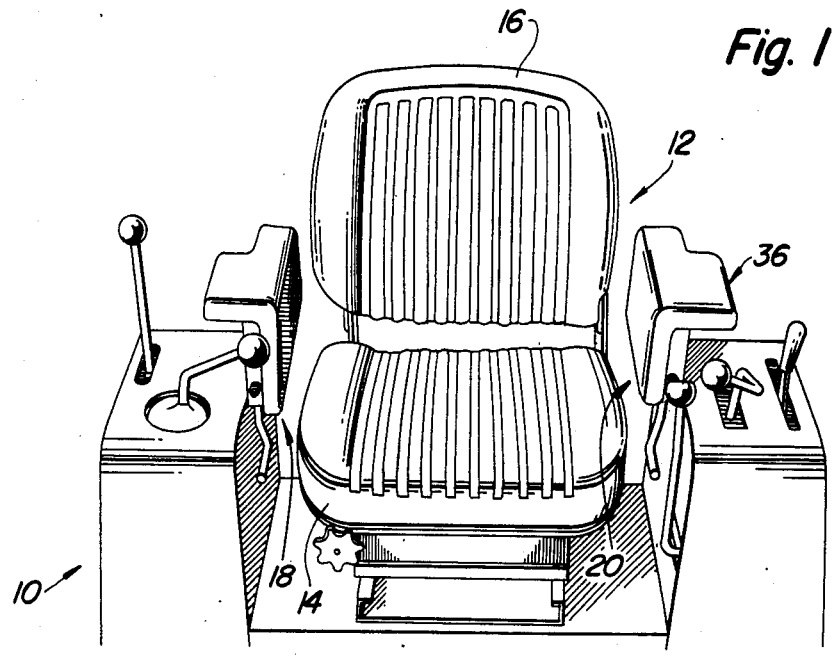
FIG. 1 is a front perspective view of a vehicle seat assembly including an armrest with which an adjustment mechanism constructed in accordance with the principles of the present invention is particularly adapted for use.

Referring now to FIG. 1, there is shown a rear portion of a vehicle 10 including an operator's seat assembly 12 including a bottom cushion 14, a back cushion 16 and right- and left-hand armrests 18 and 20. The armrests 18 and 20 are separate from the cushions 14 and 16 and are mounted in substantially similar fashion with only the mounting for the armrest 20 being shown and described for the sake of brevity.

Figure 2:
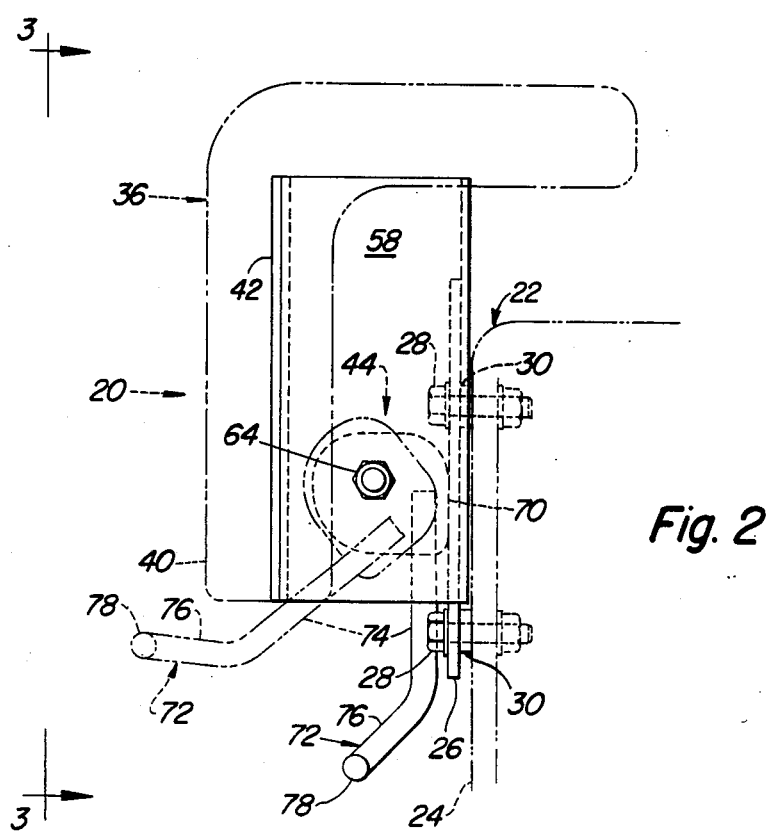
FIG. 2 is a front elevational view of the left-hand armrest and showing the adjustment mechanism.

Referring now to FIGS. 2-4, it can be seen that the tractor 10 includes a support structure 22 located outwardly of the armrest 20 and including a vertical, fore-and-aft extending wall 24 and a vertical rectangular plate 26 mounted to the wall 24 by a plurality of cap screws 28 and held in spaced parallel relationship to the wall by a plurality of spacer rings 30 respectively received on the cap screws 28 between the plate and wall. The cap screws 28 are spaced sufficiently away from vertical front and rear edges of the plate 26 that an undisturbed gap is left between front and rear portions of the plate and the wall to thereby establish front and rear vertical guide slots 32 and 34, respectively, having a purpose described hereinbelow.

The armrest 20 includes an elongate pad 36 which is L-shaped in end view and includes integral horizontal and vertical legs 38 and 40. The pad legs 38 and 40 are secured to a rigid form including a vertical plate portion 42 which faces and is parallel to the plate 26. A latch mechanism 44 for releasably fixing the armrest in selected positions on the rectangular abutment plate 26 is mounted to the plate portion 42 of the pad form.

Specifically, the latch mechanism 44 comprises spaced, front and rear, elongate brackets 46 and 48, respectively, which are formed from channel members and are arranged vertically on the plate portion 42 so as to open towards each other with respective first legs 50 and 52 being welded to the plate portion 42 and with respective second legs 54 and 56 being received in said front and rear guide slots 32 and 34. Respective bight portions 58 and 60 of the brackets 46 and 48 extend perpendicular to the plate portion 42 and extending through horizontally aligned holes in the bight portions is a long cap screw 62 having a nut 64 on one end for holding it in place. A round tube 66 having a length equal to the distance between the bight portions 58 and 60 of the brackets 46 and 48 is received on the cap screw 62 for rotating thereabout. A cam plate 68 is welded to the tube 66 at a location midway between its opposite ends. The cam plate has a flat peripheral surface 70 which is seated against a vertical abutment surface defined by one side of the plate 26 when the cam plate is in a lock position, as shown in solid lines in FIG. 2. The surface 70 is spaced from the axis of the cap screw 62 such that an interference fit exists between the cam and abutment surface when the cam plate is in its lock position. It is noted that when cam plate is in its lock position, the cap screw 62 is deflected away from the plate 26 while the brackets 46 and 48 are deflected toward each other. In this way the cam plate 68 is resiliently biased against the plate 26 and thus causes the confronting surface portions of the plate 26 and the bracket second legs 54 and 56 to be held in tight frictional engagement with each other so as to hold the armrest 20 in a desired vertical location. The armrest 20 may be released for vertical movement to another position by rotating the cam plate 68 clockwise from its lock position to a release position shown in dashed lines in FIG. 2. The flat surface 70 of the cam plate 68 is then moved away from the plate 26 and the bracket legs are then free to move vertically within the guide slots 32 and 34. To aid in the movement of the cam plate 68, a hand lever 72 is fixed to the plate 68. Specifically, the hand lever 72 is formed from a bent rod which, as viewed in FIG. 2 with the cam plate 68 in its lock position, includes a vertical section 74 welded to the cam plate and extending to a location below the vertical pad leg 40, an intermediate downwardly and outwardly inclined section 76 and a fore-and-aft extending end section 78. It will be appreciated then that an operator desiring to vertically adjust the armrest 20 needs only to insert his hand in the gap between the seat cushion 14 and the bottom of the armrest 20 and grab and pull up on the hand lever 72. The armrest 20 may then be adjusted and again locked in place by pushing down on the lever 72.

Of course, it is to be understood that the armrest 18 may be similarly adjusted.

What is claimed is:

1. A vehicle armrest structure and mounting therefor, comprising: a support structure defining a pair of fore-and-aft aligned and spaced vertical guide slots respectively opening forwardly and rearwardly and respectively including first and second vertical guide surfaces facing in a first direction; said support structure further defining a vertical abutment surface located between said vertical guide slots and facing in a second direction which is opposite to the first direction; an armrest including first and second vertical slide members respectively received in said pair of vertical guide slots; and releasable lock means carried by the armrest and including a cam member located between said slide members mounted for rotation about an axis extending parallel to the abutment surface between lock and release positions, said cam member including a peripheral surface spaced from said axis such that it bears against the abutment surface and effects light engagement between the first and second slide members and the first and second vertical guide surfaces when the cam member is in said lock position, and such that it is spaced from the abutment surface and thereby permits the armrest to be shifted vertically relative to the support structure when the cam member is in said release position.

2. The armrest structure and mounting therefor defined in claim 1 wherein said support structure includes a fore-and-aft extending vertical wall, a rectangular plate fixed in closely spaced parallel relationship to said wall and cooperating therewith to define said vertical guide slots with one side of said plate including said abutment surface and with an opposite side of said plate including said first and second vertical guide surfaces.

3. The armrest structure and mounting therefor defined in claim 2 wherein said armrest includes first and second U-shaped channel members having respective first legs forming said first and second vertical slide members and respectively being located in said vertical guide slots.

4. The armrest structure and mounting therefor defined in claims 1 or 3 wherein said armrest includes first and second U-shaped channel members having respective first legs forming said first and second vertical slide members.

5. The armrest structure and mounting therefor defined in claim 1 wherein said releasable lock means includes a pair of fore-and-aft spaced vertical plate portions disposed perpendicular relative to said abutment surface; a rod mounted in said plate portions along said axis and including means at opposite ends thereof precluding endwise movement of the rod; said cam member being mounted for rotation about the rod and including a flat surface defining said peripheral surface and which abuts against the abutment surface when the cam member is in said lock position, the flat surface being then located relative to the axis and the abutment surface so as to effect an interference fit between the flat surface and the abutment surface.

6. The armrest structure and mounting therefor defined in claim 5 wherein said armrest includes first and second U-shaped channel members having respective bight portions forming said pair of vertical plate portions.

7. A vehicle armrest structure and mounting therefor, comprising: a support structure defined by a vertical wall and a rectangular plate secured in closely spaced parallel relationship to the wall and cooperating therewith to define vertical guide slots at front and rear ends of the plate; an armrest including a pad of L-shaped cross section having a vertical leg disposed in parallel relationship to the plate and a horizontal leg extending over said plate; said armrest further including first and second vertically extending brackets including respective flanges located in said vertical guide slots and respective plate portions disposed perpendicularly to said rectangular plate; a latch mechanism including a rod mounted in said plate portions of said first and second brackets; and a cam plate being rotatably mounted to said rod and having a flat surface spaced from the rod and said rectangular plate such that when said cam plate is in a lock position an interference fit is established between said rectangular plate and cam plate, and such that when said cam plate is in a release position the flat surface is moved away from said rectangular plate so as to permit vertical adjustment of the armrest.

* * * * *

UNITED STATES PATENT AND TRADEMARK OFFICE
CERTIFICATE OF CORRECTION

PATENT NO. : 4,674,798

DATED : 23 June 1987

INVENTOR(S) : James Frank Oeth et al

It is certified that error appears in the above-identified patent and that said Letters Patent is hereby corrected as shown below:

```
Column 3, line 21, change "light" to -- tight --; and line
43, change "3" to -- 2 --.
```

Signed and Sealed this

Twenty-ninth Day of March, 1988

Attest:

DONALD J. QUIGG

*Attesting Officer*  *Commissioner of Patents and Trademarks*